United States Patent
Glamuzina, Jr. et al.

(10) Patent No.: US 9,916,745 B2
(45) Date of Patent: *Mar. 13, 2018

(54) CONTAINER FRAUD DETECTION SYSTEM AND METHOD

(71) Applicants: Steven M. Glamuzina, Jr., Williamsville, NY (US); Jeffrey C. Murphy, Lancaster, NY (US)

(72) Inventors: Steven M. Glamuzina, Jr., Williamsville, NY (US); Jeffrey C. Murphy, Lancaster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,696

(22) Filed: Nov. 22, 2016

(65) Prior Publication Data

US 2017/0076568 A1   Mar. 16, 2017

Related U.S. Application Data

(63) Continuation of application No. 14/471,747, filed on Aug. 28, 2014, now Pat. No. 9,536,404.

(51) Int. Cl.
  *G08B 13/08* (2006.01)
  *G08B 13/12* (2006.01)
  *G08B 13/24* (2006.01)

(52) U.S. Cl.
  CPC ....... *G08B 13/128* (2013.01); *G08B 13/2428* (2013.01); *G08B 13/2434* (2013.01); *G08B 13/2462* (2013.01)

(58) Field of Classification Search
  None
  See application file for complete search history.

(56) References Cited

U.S. PATENT DOCUMENTS

| | | | |
|---|---|---|---|
| 6,707,381 B1 * | 3/2004 | Maloney | G07C 9/00103 340/568.1 |
| 7,701,348 B2 | 4/2010 | Kim | |
| 7,838,844 B2 * | 11/2010 | Wagner | G06K 7/10178 250/252.1 |
| 7,839,288 B2 * | 11/2010 | Wang | B65D 55/028 340/10.1 |
| 8,081,078 B2 * | 12/2011 | Arguin | G08B 13/2411 340/10.41 |
| 8,368,539 B2 | 2/2013 | Adstedt | |
| 8,550,336 B2 | 10/2013 | Wang | |
| 8,710,990 B2 * | 4/2014 | August | G06K 19/0717 235/375 |

(Continued)

*Primary Examiner* — Julie Lieu
(74) *Attorney, Agent, or Firm* — Vincent G. LoTempio; Kloss, Stenger & LoTempio; David T. Stephenson (57) ABSTRACT

A container fraud detection system and method using one or more wireless communication tags attached to a container in specific ways to ensure the authenticity of the contents. The tag is affixed to the container in such a way that the tag is destroyed upon opening of the container, thereby indicating fraud upon scanning. The tag may be affixed to the container by an adhesive strip, polymer film or wax composition. The tag may be affixed to an adhesive strip prior to application of the strip to a container. Two tags on the container or strip may be cryptographically linked. The tag information is accessible through a scanning device which communicates with a database that stores information about the container and analyzes the probability of fraud with an algorithm.

20 Claims, 9 Drawing Sheets

(56) References Cited

U.S. PATENT DOCUMENTS

| | | | |
|---|---|---|---|
| 8,912,888 B2* | 12/2014 | Yoshida | G06K 19/07749 340/10.1 |
| 2004/0113786 A1* | 6/2004 | Maloney | G07C 9/00103 340/568.1 |
| 2007/0284333 A1* | 12/2007 | Dunnigan | B65D 79/02 215/386 |
| 2008/0218348 A1* | 9/2008 | August | G06K 19/0717 340/572.1 |
| 2008/0252463 A1* | 10/2008 | Andrechak | G06K 19/04 340/572.7 |
| 2010/0007501 A1* | 1/2010 | Yang | B01L 3/545 340/572.8 |
| 2010/0242552 A1* | 9/2010 | Sayegh | E05B 73/0017 70/58 |
| 2010/0253524 A1* | 10/2010 | Kolton | B65D 23/14 340/572.9 |
| 2011/0074583 A1* | 3/2011 | Kolton | G08B 13/2445 340/572.8 |
| 2012/0191817 A1 | 7/2012 | Sayan | |
| 2012/0242481 A1* | 9/2012 | Gernandt | G06K 19/0705 340/539.13 |
| 2013/0059534 A1* | 3/2013 | Sobalvarro | G06Q 30/02 455/41.1 |
| 2013/0088355 A1* | 4/2013 | Ashwood-Smith | G01S 5/0247 340/572.1 |
| 2015/0145680 A1* | 5/2015 | Favier | E05B 73/0017 340/572.9 |
| 2015/0332355 A1* | 11/2015 | Kost | G06Q 30/0283 705/35 |

* cited by examiner

CONTAINER FRAUD DETECTION SYSTEM AND METHOD

This application is a continuation-in-part of a U.S. patent application having the Ser. No. 14/471,747 and a filing date of Aug. 28, 2014.

FIELD

The present disclosure relates generally to a container fraud detection system and method for detecting fraud of a container. More so, a container fraud detection system and method encapsulates a wireless communication tag into a container, and utilizes an algorithm to detect fraud and ensure the authenticity of a container. The present disclosure generally relates to the field(s) of near field and radio frequency communication. More specifically, embodiments of the present invention pertain to radio frequency (RF and/or RFID) and near field communication (NFC) tags and devices with a mechanism for detecting an open container while allowing for tags on the container to communicate wirelessly.

BACKGROUND

Counterfeiting and diversion, or product sales to unauthorized regions or distributors are prevalent in the distribution industry. Such activities may result in loss of revenue from the sale of genuine products, as well as brand dilution, having a negative impact on future product sales. In the case of unauthorized distribution, the brand company pricing problems could result.

In the wine industry, where so much of the revenue relies on brand name, this problem is particularly acute. Therefore, packaging of wine that offers protection from fraud would be valuable. However, there are alternative wine closures are substitute closures used in the wine industry for sealing wine bottles in place of traditional cork closures. These synthetic corks are made from plastic compounds designed to look and "pop" like natural cork, but without the risk of TCA contamination.

Types of wines are most often packaged in glass bottles and depending on the kind or quality of the wine, the bottles are sealed with a cork. Some wines, such as champagnes, are corked with stoppers, or closures, having enlarged heads and which can be grasped and twisted. However the majority of red, white and rose wines are "corked" with closures made out of cork which is recessed in the neck of the bottle requiring some implement such as a corkscrew to extract the cork. Though there are other wines that are bottle packaged with "screw tops" and movement in this direction is obviously predicated to some extent on meeting consumer's demands for packaging which is easily opened without the necessity of additional equipment.

Various methods and systems exist for fraud protection, including technology to protect against counterfeiting and diversion. Bar codes and complex labels can be effective, however, sophisticated means of fraud exist for higher end products. A determination of a fraudulent product may require chemical analysis, resulting in high costs and delay for a manufacturer and distributor.

In order to overcome the limitations of holograms and enhance the level of security while preserving the ability to verify authenticity, manufacturers of certain products, including premium products such as alcoholic beverages and other expensive yet difficult to detect fraudulent products, wireless solutions that combine RFID or NFC tags with reader devices. One particularly convenient implementation—due to the wide availability of NFC-capable smartphones (500 million in use by 2014 and 1 billion to be sold worldwide from 2014 and 2015) combines NFC (13.56 MHz High Frequency (HF) RFID) tags with NFC-capable smartphones. In this implementation, NFC tags are placed in such a way that opening the protected product destroys the NFC tag, generally by breaking the antenna in some way (for example, poking the antenna with a corkscrew or twisting and breaking the antenna in the act of opening a screw-top container). This means that cloud services that authenticate protected items based on the NFC tag's ID cannot be used after the protected item has been opened.

In many instances, wine fraud occurs when the wine bottle is molested to change either the wine, or the bottle itself. The wines can be adulterated, usually with the addition of cheaper products such as juices and sometimes with the addition of harmful chemicals and sweeteners to compensate in color or flavor. Another form, is the substitution of labels, with cheap poor quality products sold under the labels of more expensive better wines. It is known that Federal governments and individual producers have taken many efforts in order to curb the prevalence of wine fraud. Some examples include marking bottles with engraved serial numbers on the glass and taking more control of the distribution process of their wines. Better documentation of the wine bottles can also help reduce wine fraud. However, for older vintages, the threat of fraud persists.

It is well known that a container stopper, especially for wine, is generally made from cork, which is an impermeable, buoyant material. Because of its impermeability, buoyancy, elasticity and fire retardant properties, cork is used in a variety of products, the most common of which is for wine stoppers. Multiple types of container closures may have other components and materials integrated therein.

Near-field communication (NFC) is a type of radio frequency communication technology, operating at about 13.56 MHz and at bandwidth of about 2 MHz, which allows for read-only and read-write communications between a NFC-enabled RF tag reader and a NFC-enabled tag. NFC operation is based on inductive coupling between two loop antennas, which allows for sharing of power and data between NFC-enabled devices.

RFID tags are similar to NFC tags, however, they have a greater range. NFC tags have a basic architecture that is similar to RFID tags. They both have a storage memory, along with a radio chip attached to an antenna. A difference is that NFC tags are formatted to be used with NFC systems. NFC tags are small and inexpensive enough to integrate into a wide variety of products.

Even though the above cited methods for detecting wine fraud address some of the needs of the market, a container fraud detection system and method that integrates a wireless communication device tag into a container top, or elsewhere on the container, and then tracks and analyzes information from the tag to predict fraud is still desired.

SUMMARY

The present invention is directed to a container fraud detection system and method that encapsulates a wireless communication tag into a container to help track the container and ensure the authenticity of the container. The tag stores information about the container. In one embodiment, the tag is physically integrated into a container closure through encapsulation by multiple layers of a polymer film and a wax composition. The physical condition of the container closure may serve as an indication of whether tampering has occurred to the tag. The information in the tag is accessible through a reading device, such as a scanner. The reading device communicates with a database that stores information about the container and analyzes the probability of fraud with an algorithm. The algorithm analyzes the information about the container, such as shipping history, contents, and location, to predict whether fraud is likely. In this manner, both the physical condition of the container, and the predictive capacity of the algorithm work in conjunction to help detect fraud on the container.

The system is not limited to wine bottles or corked bottles. A system where the tags are incorporated in to a label, where when the container is opened the label and tag are damaged, is also useful in terms of fraud detection. The tag may be attached to the container by any adhesive means.

In one embodiment, the container is a wine bottle. The bottle stopper, or closure, is a cork used to close off a bottle neck for storing wine in a wine bottle. In another embodiment, the wireless radio communications tag may include, without limitation, a near field communication (NFC) tag. The tag is restrained against the bottle closure or general proximity of the bottle neck by multiple layers of fastening material. The information on the tag is accessed through a remote database. The information can be viewed by a user, and analyzed by an algorithm to detect fraud.

In some embodiments, the tag may be encapsulated on the container closure with a thin polymer film that wraps around the tag and the container closure. The polymer film can be heated to contract around the container closure, consequently forming a snug fit around the container closure and the tag. In this manner, the polymer film forms a smooth overlaying surface that securely integrates the tag with the container closure. Thus, any attempt to access the tag by removing the thin polymer film is visibly apparent due to the nature of the polymer film to tear and form jagged edges when manipulated.

In some embodiments, a wax composition may be applied over the NFC tag. The wax composition serves to secure the tag onto the container closure, and also prevents extraction of the liquid contents via a needle passed through the cork. The wax composition may include beeswax that covers the NFC tag. Thus, the beeswax is effective in providing a barrier against extraction of the liquid contents of the container via needle passed through the cork. Due to the wax layer being affixed to the top of the cork, removal of the layer is not possible within damaging the NFC tag.

In some embodiments, the tag may be used to store information about the contents of the container. In essence, the tag provide instant access to the information about the container, which may include, without limitation, a container content, a location history, a shipping route, a manufacturing date, manufacturer contact information, a price, a dietary information, and a website URL link. The information may be stored in a remote database, which can be accessed with the tag to review and verify the authenticity of the container. In one embodiment, the information in the tag can be accessed, viewed, and manipulated through a reading device, such as a smart phone.

Thus, the aforementioned tamper proof integration of the tag into the container closure or container neck region may be efficacious for eliminating removal or modification of the tag. Consequently, fraud is prevented because removal of the tag requires removing the wax composition and the polymer film from the container closure, thus creating a visibly obvious disfigurement of the container. However, the system and method is configured such that even if a fraudulent tag replaced an authentic tag the algorithmic security features provided by the system and method would be able to detect it as fraudulent.

The use of the at least two wireless communication tags allows the tags to be cryptographically linked according to the present disclosure. Wireless communication tags are produced with a unique identification number, or serial number. According to the present disclosure, the identification numbers of each tag are linked with a code. The code that links the two tags is a secret identifier, known only, initially, to the producer of the system of the present disclosure. A cryptographic algorithm links the identifiers of each individual code in a tag. Therefore, even if the tags are copied and used to replace a tag for fraudulent purposes, the combination of tags will identify fraud due to a lack of cryptographic linkage. An attempt at fraud would fail because the cryptographic code wouldn't be identified and therefore can't be copied. Fraudulent replacement tags would be identified as fraudulent because the cryptographic link would not be present.

In one embodiment, a container, having a container closure, or top, and a container body for holding contents where a junction is formed between the closure and the body. The wireless communication device may be attached over the junction, so that when the container is opened the tag is broken and is no longer readable, which will indicate fraudulent activity. Any type of junction for a container may be contemplated for use with the tag covering the opposing portions of the junction. A first tag (which may be an NFC tag) may be enclosed in a hard wax, such as beeswax which may crack upon opening or tampering to ensure breakage of the enclosed tag. A second tag may be placed elsewhere on the container, not adjacent to the junction, such that the second tag is not damaged during opening of the container. The wax and tag may span the junction to provide a seal for fraud protection.

Alternatively, an adhesive strip may pass across the junction, where the adhesive strip has a wireless communication tag affixed on the adhesive strip directly adjacent the junction such that the first tag is broken upon opening of the container. Further, removal of the adhesive strip would cause the first tag to be removed. A second tag may be placed elsewhere on the adhesive strip, not adjacent the junction, such that opening of the container would not damage the second tag. The adhesive strip may be a thin polymer or adhesive backed paper. The adhesive strip may be pre-manufactured with the tags on the strip prior to application to a container. The tags would be positioned on the strip such that one tag covers the junction while the other is away from the junction and would not be damaged upon opening.

The use of wireless communication tags, such as NFC tags, in conjunction with the adhesive strip allows for the adhesive strips to be manufactured separately with the tags and then applied to the container at a later date. The container may be a large container such as a drum or box or a small container such as a pharmaceutical bottle.

NFC tags are generally manufactured with a serial number that allows them to be identified by any user with a device such as a smart phone. However, wireless communication tags such as an NFC tag, under the present disclosure, may be cryptographically linked.

The system utilizes a database for storing the information about the container. The database may also include an algorithm to organize and decipher the information about the container. The algorithm is efficacious for predicting the probability of fraud on the container since various parameter and variables of the container can be used to indicate fraud.

In one embodiment, the algorithm may utilize predictive analytics to perform statistical techniques including modeling, machine learning, and data mining that analyze current and historical facts about the container, and similar containers, to make predictions about future, or otherwise unknown, events. Thus, factors, such as present location, shipping history, and the type of wine in the container can be analyzed to calculate a probability of whether the particular container in question is authentic or counterfeit.

One objective of the present invention is to authenticate, as genuine or fraudulent, a wine contained in a container.

Another objective is to track suspicious movements of the container that may indicate fraud.

Another objective is to enable real time access to information pertinent to the container.

Another objective is to integrate an NFC tag into a cork, such that attempts to remove the NFC tag are visibly apparent.

Another objective is to integrate an NFC tag into the container without altering the container.

Yet another objective is to operatively connect the NFC tag with a remote database, such that a user can access the information from the database at any time with a simple reading device.

Yet another objective is to predict the probability of fraud with an algorithm that analyzes information about the container.

Yet another objective is to provide a simple fraud detection system and method that can be accessed over numerous platforms.

Yet another objective is to use an adhesive strip with wireless communication tags attached to apply to a container to detect fraud.

Yet another objective is to attach wireless communication tags to a container at a junction to detect fraud upon opening of the container.

These and other advantages of the invention will be further understood and appreciated by those skilled in the art by reference to the following written specification, claims and appended drawings.

BRIEF DESCRIPTION

The invention will now be described, by way of example, with reference to the accompanying drawings, in which:

FIGS. 2A and 2B illustrate top view of exemplary reading devices, where FIG. 2A illustrates an exemplary legitimate message, and FIG. 2B illustrates an exemplary fraudulent message, in accordance with an embodiment of the present invention;

FIGS. 3A, 3B, and 3C illustrate detailed perspective views of an exemplary tag integrated into an exemplary container closure, where FIG. 3A illustrates the tag positioned above the container closure, FIG. 3B illustrates a polymer film wrapped around the tag and a wax composition being applied over the polymer film and the tag, and FIG. 3C illustrates the wax composition and the polymer film overlaying the tag, in accordance with an embodiment of the present invention;

Like reference numerals refer to like parts throughout the various views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention, presented in FIGS. 1-5, a container fraud detection system 100 and method 200 encapsulates a wireless communication tag 102 into a container 104 to help track the container 104 and ensure the authenticity of the container 104. The tag 102 stores information pertinent to the container 104. The information in the tag 102 is accessible through a reading device 112 for viewing, and analysis by an algorithm for predicting possible fraud on the container 104. The reading device 112 communicates with a database 114 that stores information about the container 104. The database 114 also includes an algorithm that helps predict the probability of fraud for the container 104.

Figure 3A:
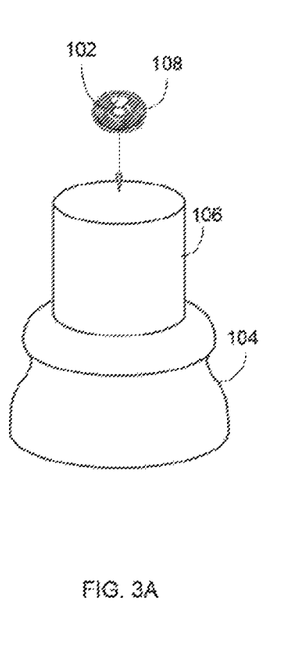
Figure 3B:
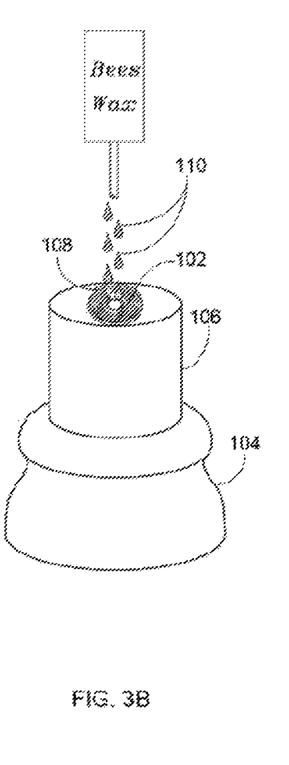
Figure 3C:
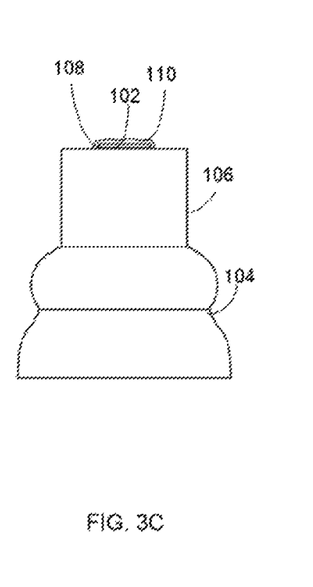

In one embodiment, the tag 102 is physically integrated into a container closure 106 through encapsulation by multiple layers of a polymer film 108 and a wax composition 110. The physical condition and position of the container closure 106, the polymer film 108 the wax composition 110, and the tag 102 serves as an indication of whether tampering has occurred to the container 104. The algorithm analyzes the information about the container 104, such as shipping history, contents, and location, to predict whether fraud is likely. In this manner, both the physical condition of the container 104, and the predictive capacity of the algorithm work in conjunction to help detect fraud on the container 104.

The container 104 may include a wine bottle. However, in other embodiments, the container 104 may contain any consumable contents, including, liquor, juice, jams or foods. In one possible embodiment, the container fraud detection system 100 and method 200 involves encapsulating a wireless communication tag 102, containing information pertinent to the container 104, into a container closure 106 for tracking and ensuring the authenticity of the container 104. The system 100 and method 200 enables real time monitoring of a container 104 by integrating a wireless radio communication tag 102 into a container closure 106, or general proximity of a container neck.

In one embodiment, the container closure 106 is a cork on a wine bottle. However, in other embodiments, the container closure 106 may include, without limitation, a screw cap, a crown cork, a rubber stopper, and a wax seal. In one embodiment, the wireless radio communications tag 102 may include, without limitation, a near field communication (NFC) tag. The tag 102 is restrained against the container closure 106 or general proximity of the container 104 neck by multiple layers of fastening material. The information stored in the tag 102 is accessed through a reading device 112, which communicates with a database 114. In this manner, the information about the container can be viewed by a user, and analyzed by an algorithm to detect fraud.

Figure 1:
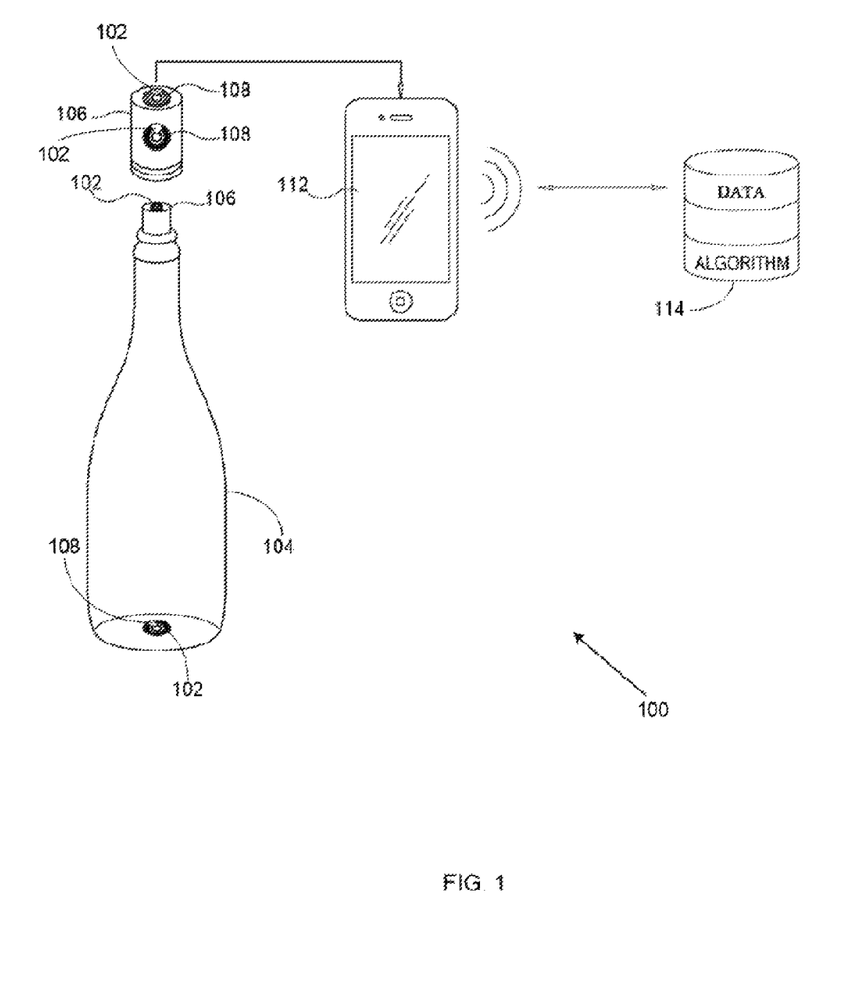
FIG. 1 illustrates a block diagram of an exemplary container fraud detection system, in accordance with an embodiment of the present invention.

FIG. 1 shows a container fraud detection system 100 that helps detect fraud for a container 104 by integrating a wireless communication tag 102 into a container closure 106, or the general region of a container neck. However, in one alternative embodiment, the tag 102 may be integrated in the base of the container 104. In some embodiments, the wireless communication tag 102 may be encapsulated in the container closure 106 with a thin polymer film 108 that wraps around the tag 102 and the container closure 106. A wax composition 110 forms a secondary layer over the polymer film 108 and the tag 102. The polymer film 108 and the wax composition 110 integrate the tag 102 into the container closure 106, such that tampering and other fraudulent acts are at least partially restricted.

In some embodiments, the tag 102 may be used to store information about the contents of the container 104. In essence, tag 102 provides instant access to the information about the container 104. The information may include, without limitation, a container content, a location history, a shipping route, a manufacturing date, manufacturer contact information, a price, a dietary information, and a website URL link. The information may be stored in a remote database 114, which can be accessed through the reading device 112 to help review and verify the authenticity of the container 104.

Those skilled in the art, in light of the present teachings, will recognize that an NFC tag is a wireless technology which allows for the transfer of data such as text or numbers between two NFC enabled reading devices. Various sets of data types can be stored on the NFC tag. The actual amount of data varies depending on the type of NFC tag used, as different tag 102s have different memory capacities. For example, a standard Ultralight NFC tag can store a URL of around forty one characters, whereas an NTAG NFC tag can store a URL of around one hundred thirty two characters.

In one embodiment, the information in the tag 102 can be accessed, viewed, and manipulated through a reading device 112, such as a smart phone. In other embodiments, the reading device 112 may include, without limitation, a tablet, a computer, a scanner, and a server. Furthermore, the tag 102 may be scanned using standard off the shelf cellular phones having apps that can read the tag 102. The reading device 112 communicates with the database 114, which is configured to store, analyze, and return information about the container 104 and the probability of fraud. The database 114 stores the information about the container 104 for retrieval by the reading device 112. The database 114 may include an algorithm to analyze the information about the container 104. The algorithm is efficacious for predicting the probability of fraud on the container 104 since various parameter and variables of the container 104 can be used to indicate fraud. In one embodiment, the algorithm may utilize predictive analytics to perform statistical techniques including modeling, machine learning, and data mining that analyze current and historical facts about the container 104 to make predictions about future, or otherwise unknown, events.

Figure 2A:
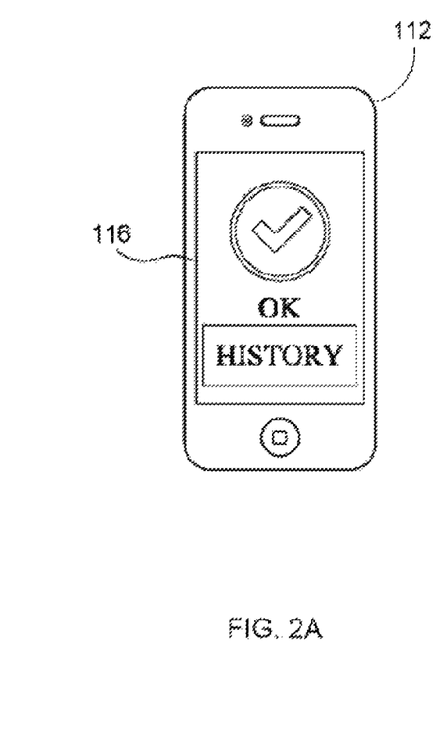
Figure 2B:
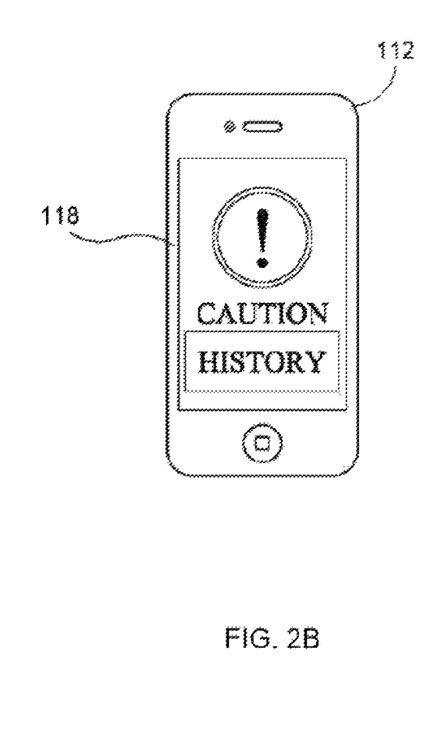

As referenced in FIGS. 2A and 2B, the reading device 112 displays messages for alerting about the status of the container 104, based on the analysis of the algorithm. In one embodiment, the reading device 112 displays a legitimate message 116 if the probability of a legitimate, untampered container 104 is great. However, if the algorithm predicts a tampered container 104 or container closure 106, the reading device 112 displays a fraudulent message 118. In this manner, the authenticity of the container 104 may be quickly verified. The reading device 112 includes a display that presents the messages 116, 118 in an easy to view and understand colored, graphical format. This provides enhanced visual information. In some embodiments, the scanning of the tag 102 may be accomplished using a purpose built application, running the application on the smart phone, coupled with a cloud computing based warehouse and the algorithm for detecting the fraud. It is also significant to note that since the system 100 utilizes standard closures, no retooling of the bottling equipment would be required.

As referenced in FIG. 3A, the polymer film 108 wraps around the tag 102 in the general proximity of the container closure 106 or container neck. However, in one alternative embodiment, the tag 102 may be integrated in the base, body, or neck regions of the container 104. In some embodiments, the polymer film 108 can be heated to contract around the container closure 106, consequently forming a snug fit around the container closure 106 and the tag 102. In one embodiment, the polymer film 108 comprises a thin film of polyolefin that is heated or shrink wrapped over the tag 102 and the container closure 106 to form a tight fit. In this manner, the polymer film 108 forms a smooth overlaying surface that securely integrates the tag 102 with the container closure 106. Thus, any attempt to access the tag 102 by removing the polymer film 108 is visibly apparent due to the nature of the polymer film 108 to tear and form jagged edges when manipulated.

Turning now to FIG. 3B, a wax composition 110 is applied over the tag 102. The wax composition 110 provides a layer of wax that serves to secure the tag 102 onto the container closure 106, and also prevents extraction of the liquid contents via a needle passed through the container closure 106. This is especially problematic due to the soft characteristics of cork. The wax composition 110 may include beeswax that covers the tag 102. Thus, the beeswax is effective in providing a barrier against extraction of the liquid contents of the container 104 via needle passed through the container closure 106. Due to the wax composition 110 being affixed to the top of the container closure 106, removal of the wax composition 110 is not possible within damaging the tag 102 (FIG. 3C).

Thus, the aforementioned tamper proof integration of the tag 102 into the container closure 106 or container neck region may be efficacious for eliminating removal or modification of the tag 102. Consequently, fraud is prevented because removal of the tag 102 requires removing the wax composition 110 and the polymer film 108 from the container closure 106, thus creating a visibly obvious disfigurement of the container 104. However, the system 100 and method 200 is configured such that even if a fraudulent tag 102 replaced an authentic tag 102, accessing the database 114 would not be possible, due to algorithmic security features provided by the system 100 and method 200.

For example, by applying these data analytics across the entire data set of container 104 movements through the supply/retail chain, it is possible to develop metrics that would identify which vintages of wine are more likely to be counterfeited. Thus, factors, such as present location, shipping history, and the type of wine in the container 104 can be analyzed to calculate a probability of whether the wine is authentic or counterfeit. In another example, the shipping history and location of the container 104 can indicate fraud. If an NFC tag on a unique wine container 104 tag 102 is scanned in New York, and then the same container 104 appears to be scanned again in Los Angeles within an hour, it could be concluded that one of the two scanned containers was a counterfeit (using a cloned tag) due to the low probability of shipping the container 104 between those two cities in such a short time frame.

Yet another example of the algorithm detecting fraud could be the large number of French wine bottles detected in California. While French wine is sold in California, the odds of thousands of French wine bottles appearing in California in a short span of time could raise red flags in the algorithm, as this may indicate that tags 102 are being removed from the wine bottles and collected from sold or consumed wine bottles for reuse. Additional anti-fraud measures provided by the system 100 may involve monitoring the container's 104 prior movement from a retail seller, to a private buyer, and back to a retail seller. In this example, this pattern of movement is possible, but the algorithm would still provide a fraudulent message 118 to alert the consumer or collector. The fraudulent message 118 enables further investigation and questioning about the authenticity of the container 104 prior to making a purchase.

Figure 4A:
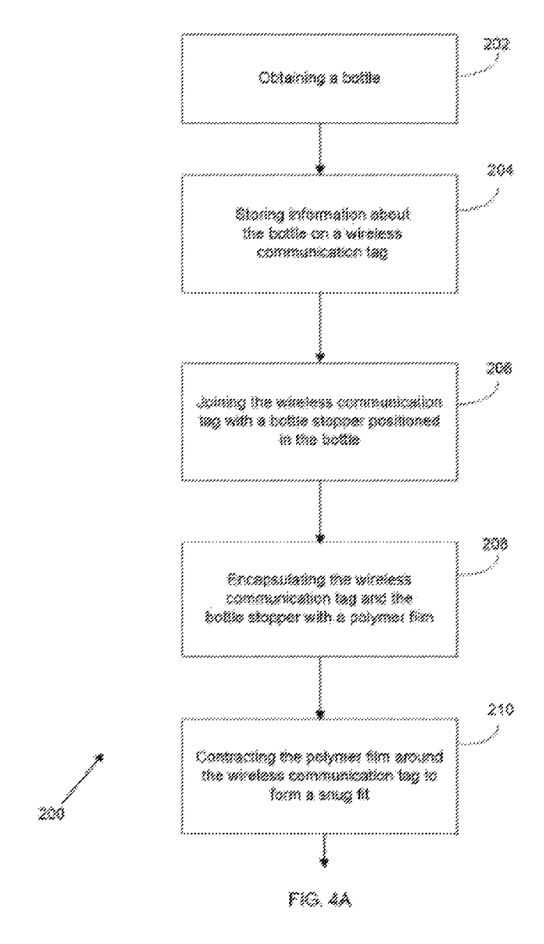
FIGS. 4A and 4B illustrate a flow chart diagram of an exemplary container fraud detection method, in accordance with an embodiment of the present invention.
Figure 4B:
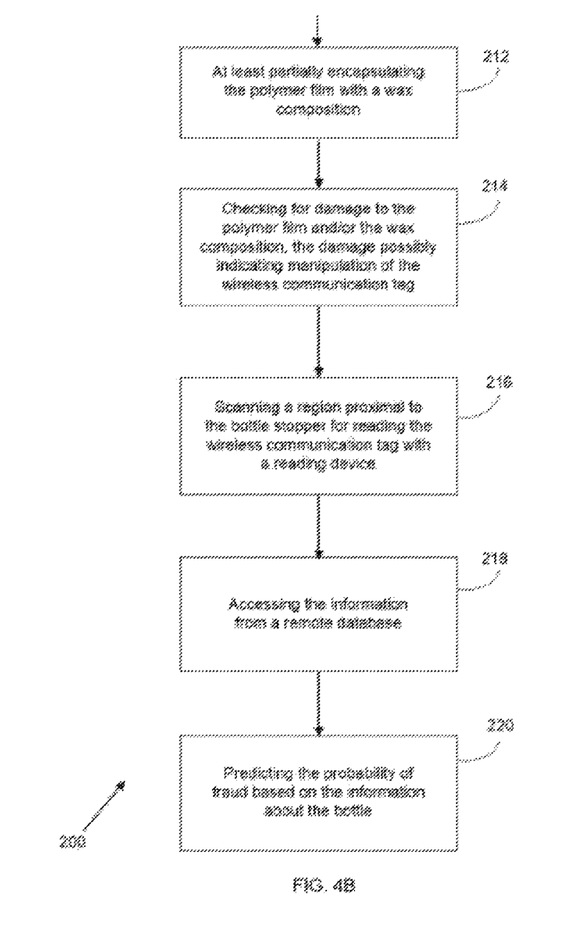

FIGS. 4A and 4B illustrate a flowchart diagram of an exemplary method 200 for detecting fraud for a container 104. The method 200 encapsulates a wireless communication tag 102 into a container 104 to help track the container 104 and ensure the authenticity of the container 104. The tag 102 stores information pertinent to the container 104. The information is accessible through a reading device 112 for viewing, and analysis by an algorithm for predicting possible fraud on the container 104. The method 200 may include an initial Step 202 of obtaining a container 104. The container 104 may include a wine bottle. Those skilled in the art, in light of the present teachings, will recognize that wine fraud tampering of the container 104 to change either the wine, or the container 104 itself. The wines can be adulterated, usually with the addition of cheaper products.

The method 200 may further comprise a Step 204 of storing information about the container 104 on a wireless communication tag 102. The tag 102 may be used to store information about the contents of the container 104. In essence, the tag 102 provide instant access to the information about the container 104. The information may include, without limitation, a container 104 content, a location history, a shipping route, a manufacturing date, manufacturer contact information, a price, a dietary information, and a website URL link. The information may be stored in a remote database 114, which can be accessed through the tag 102 to review and verify the authenticity of the container 104.

A Step 206 includes joining the wireless communication tag 102 with a container closure 106 positioned in the container 104. A polymer film 108 wraps around the tag 102 in the general proximity of the container closure 106 or container neck. In some embodiments, a Step 208 comprises encapsulating the wireless communication tag 102 and the container closure 106 with a polymer film 108. A Step 210 includes contracting the polymer film 108 around the wireless communication tag 102 to form a snug fit. The polymer film 108 integrates the tag 102 into the container closure 106 or container neck. The polymer film 108 can be heated to contract around the container closure 106, consequently forming a snug fit around the container closure 106 and the tag 102.

In some embodiments, a Step 212 may include at least partially encapsulating the polymer film 108 with a wax composition 110. The wax composition 110 is applied over the polymer film 108 to create a second layer of security for the tag 102. The wax composition 110 serves to secure the tag 102 onto the container closure 106, and also protects the polymer film 108 from physical damage or undesirable removal of the tag 102. A Step 214 comprises checking for damage to the polymer film 108 and/or the wax composition 110, wherein the damage possibly indicates manipulation of the wireless communication tag 102. Fraud is prevented because removal of the tag 102 requires removing the wax composition 110 and the polymer film 108 from the container closure 106, thus creating a visibly obvious disfigurement of the container 104. In some embodiments, a Step 216 may include scanning a region proximal to the container closure 106 for reading the wireless communication tag 102 with a reading device 112, such as a smart phone having a scanning app. In one embodiment, the information in the tag 102 can be accessed, viewed, and manipulated through a reading device 112, such as a smart phone.

A Step 218 comprises accessing the information from a remote database 114. A database 114 for storing the information about the container 104. The reading device 112 communicates with a database 114 to retrieve information. The database 114 also contains an algorithm for predicting the probability of fraud and operating other manipulations for the method 200. A final Step 220 includes predicting the probability of fraud based on the information about the container 104. The database 114 may also include an algorithm to analyze the information about the container 104. The algorithm is efficacious for predicting the probability of fraud on the container 104 since various parameter and variables of the container 104 can be used to indicate fraud. In one embodiment, the algorithm may utilize predictive analytics to perform statistical techniques including modeling, machine learning, and data mining that analyze current and historical facts about the container 104 to make predictions about future, or otherwise unknown, events.

Figure 5:
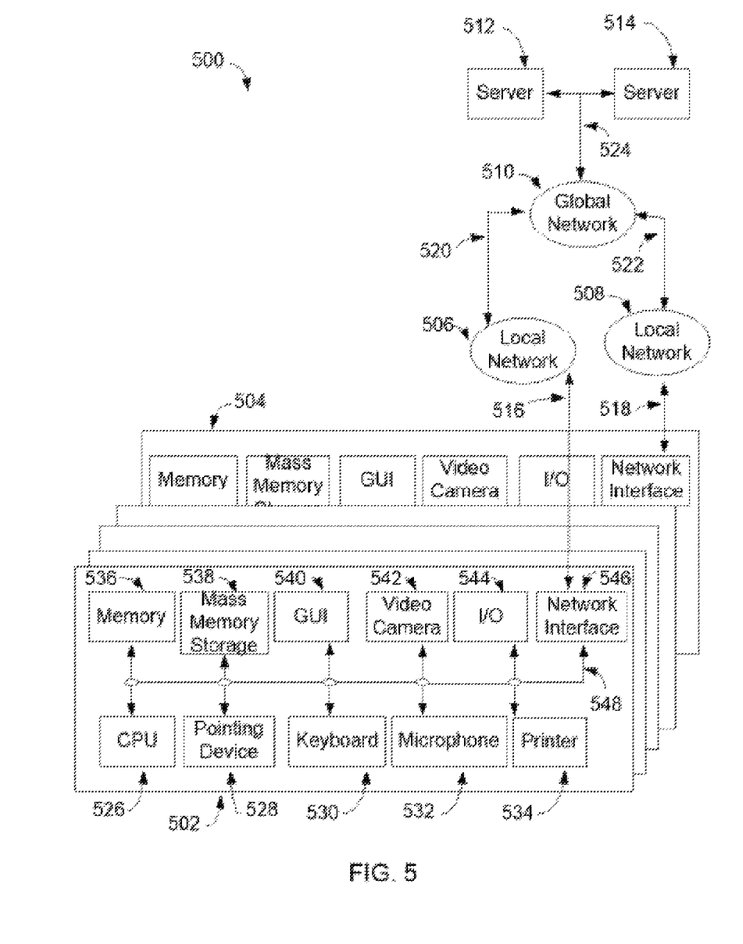
FIG. 5 illustrates a block diagram depicting an exemplary client/server system which may be used by an exemplary web-enabled/networked embodiment, in accordance with an embodiment of the present invention.

FIG. 5 is a block diagram depicting an exemplary client/server system which may be used by an exemplary web-enabled/networked embodiment of the present invention. In the present invention, a communication system 500 includes a multiplicity of clients with a sampling of clients denoted as a client 502 and a client 504, a multiplicity of local networks with a sampling of networks denoted as a local network 506 and a local network 508, a global network 510 and a multiplicity of servers with a sampling of servers denoted as a server 512 and a server 514.

Client 502 may communicate bi-directionally with local network 506 via a communication channel 516. Client 504 may communicate bi-directionally with local network 508 via a communication channel 518. Local network 506 may communicate bi-directionally with global network 510 via a communication channel 520. Local network 508 may communicate bi-directionally with global network 510 via a communication channel 522. Global network 510 may communicate bi-directionally with server 512 and server 514 via a communication channel 524. Server 512 and server 514 may communicate bi-directionally with each other via a communication channel 524. Furthermore, clients 502, 504, local networks 506, 508, global network 510 and servers 512, 514 may each communicate bi-directionally with each other.

In one embodiment, global network 510 may operate as the Internet. It will be understood by those skilled in the art that communication system 500 may take many different forms. Non-limiting examples of forms for communication system 500 include local area networks (LANs), wide area networks (WANs), wired telephone networks, wireless networks, or any other network supporting data communication between respective entities.

Clients 502 and 504 may take many different forms. Non-limiting examples of clients 502 and 504 include personal computers, personal digital assistants (PDAs), cellular phones and smartphones.

Client 502 includes a CPU 526, a pointing device 528, a keyboard 530, a microphone 532, a printer 534, a memory 536, a mass memory storage 538, a GUI 540, a video camera 542, an input/output interface 544 and a network interface 546.

CPU 526, pointing device 528, keyboard 530, microphone 532, printer 534, memory 536, mass memory storage 538, GUI 540, video camera 542, input/output interface 544 and network interface 546 may communicate in a unidirectional manner or a bi-directional manner with each other via a communication channel 548. Communication channel 548 may be configured as a single communication channel or a multiplicity of communication channels.

CPU 526 may be comprised of a single processor or multiple processors. CPU 526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 536 is used typically to transfer data and instructions to CPU 526 in a bi-directional manner. Memory 536, as discussed previously, may include any suitable computer-readable media, intended for data storage, such as those described above excluding any wired or wireless transmissions unless specifically noted. Mass memory storage 538 may also be coupled bi-directionally to CPU 526 and provides additional data storage capacity and may include any of the computer-readable media described above. Mass memory storage 538 may be used to store programs, data and the like and is typically a secondary storage medium such as a hard disk. It will be appreciated that the information retained within mass memory storage 538, may, in appropriate cases, be incorporated in standard fashion as part of memory 536 as virtual memory.

CPU 526 may be coupled to GUI 540. GUI 540 enables a user to view the operation of computer operating system and software. CPU 526 may be coupled to pointing device 528. Non-limiting examples of pointing device 528 include computer mouse, trackball and touchpad. Pointing device 528 enables a user with the capability to maneuver a computer cursor about the viewing area of GUI 540 and select areas or features in the viewing area of GUI 540. CPU 526 may be coupled to keyboard 530. Keyboard 530 enables a user with the capability to input alphanumeric textual information to CPU 526. CPU 526 may be coupled to microphone 532. Microphone 532 enables audio produced by a user to be recorded, processed and communicated by CPU 526. CPU 526 may be connected to printer 534. Printer 534 enables a user with the capability to print information to a sheet of paper. CPU 526 may be connected to video camera 542. Video camera 542 enables video produced or captured by user to be recorded, processed and communicated by CPU 526.

CPU 526 may also be coupled to input/output interface 544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 526 optionally may be coupled to network interface 546 which enables communication with an external device such as a database or a computer or telecommunications or internet network using an external connection shown generally as communication channel 516, which may be implemented as a hardwired or wireless communications link using suitable conventional technologies. With such a connection, CPU 526 might receive information from the network, or might output information to a network in the course of performing the method steps described in the teachings of the present invention.

Figure 6:
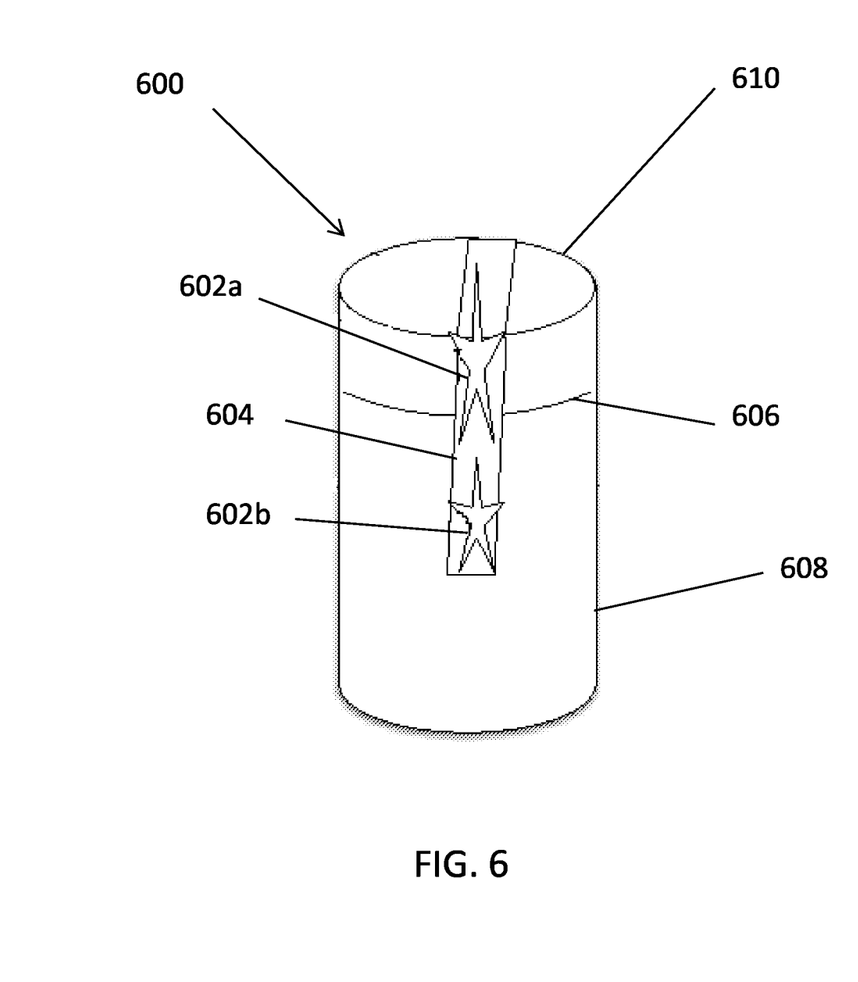
FIG. 6 illustrates a container and adhesive strip with two wireless communication tags attached according to the system of the present disclosure.

FIG. 6 shows a container 600, having a container closure 610 and a container body 608 for holding contents where a junction 606 is formed between container closure 610 and the container body 608. Wireless communication tags 602*a* and 602*b* are attached to an adhesive strip 604, which may be made of polymer film, paper and the like, where the first wireless communication tag 602*a* is attached over the junction 606, such that when the adhesive strip 604 is applied and the container 600 is opened the wireless communication tag 602*a* is damaged and is no longer readable, which indicates fraudulent activity. Any type of junction 606 for any type of container may be contemplated for use with the tag covering the opposing portions of the junction, including a slit at a box opening junction or other type of junction. A first wireless communication tag 602*a* (which may be an NFC tag) may, in one embodiment, be enclosed in a hard wax, such as beeswax which may crack upon opening or tampering to ensure breakage of the enclosed tag or visible identification of tampering with container 600. A second tag 602*b* is be placed elsewhere on the adhesive strip 604, not adjacent to the junction 606, such that the second tag 602*b* is not damaged upon opening of the container 600.

Adhesive strip 604 may be manufactured having wireless communication tags 602*a* and 602*b* attached prior to application to the container 600. Adhesive strip 604 may be custom manufactured such that wireless communication tags 602*a* and 602*b* are located at pre-determined distances along adhesive strip 604 such that application of the adhesive strip 604 in the proper manner results in a first wireless communication tag 602*a* over the junction 606 and a second wireless communication tag 602*b* away from the junction 606 such that the second wireless communication tag 602*b* is not damaged upon opening of the container 600, but the first wireless communication tag 602*a* is damaged upon opening of the container 600.

Figure 7:
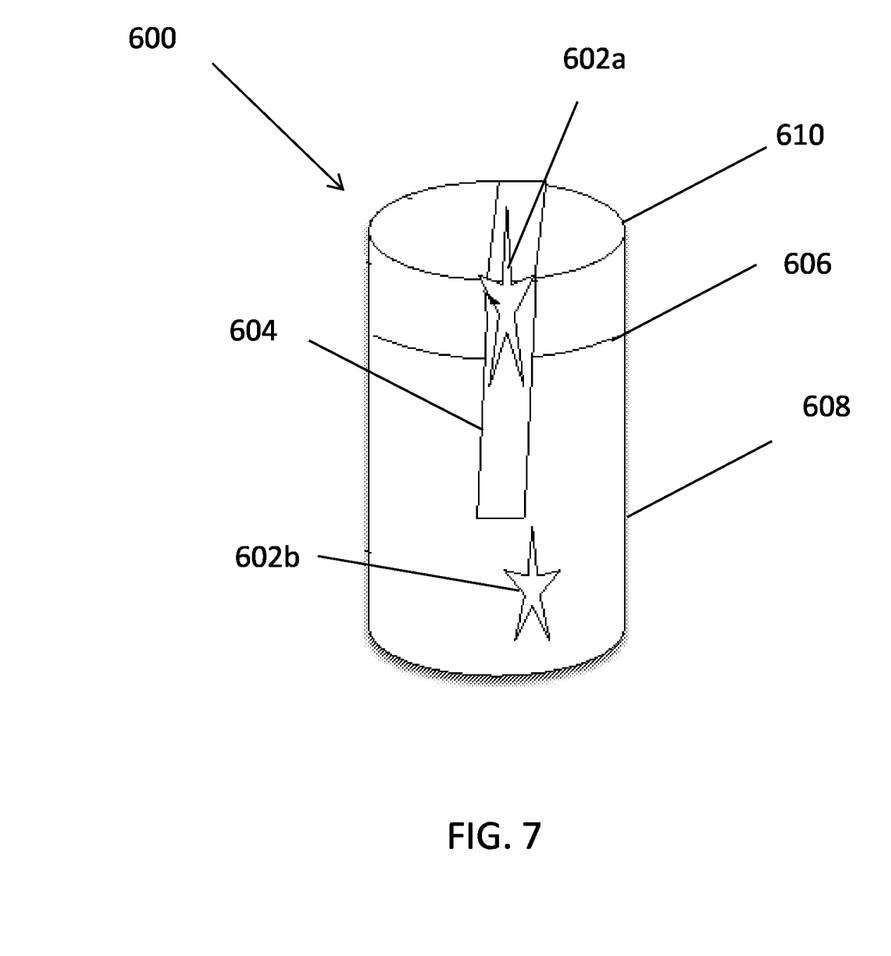
FIG. 7 illustrates a container and adhesive strip with one wireless communication tag attached to the adhesive strip according to the system of the present disclosure and one wireless tag attached to the container.

FIG. 7 shows an alternative embodiment where further, removal of the adhesive strip 604 would cause first wireless communication tag 602*a* to be removed. A second wireless communication tag 602*b* may be placed elsewhere on the container 600, rather than on adhesive strip 604, such that opening of the container 600 or removal of adhesive strip 604 would not disrupt, remove or damage second wireless communication tag 602*b*. The adhesive strip 604 may be an adhesive backed thin polymer film or adhesive backed paper or other materials as would be known to one of ordinary skill in the art.

Figure 8:
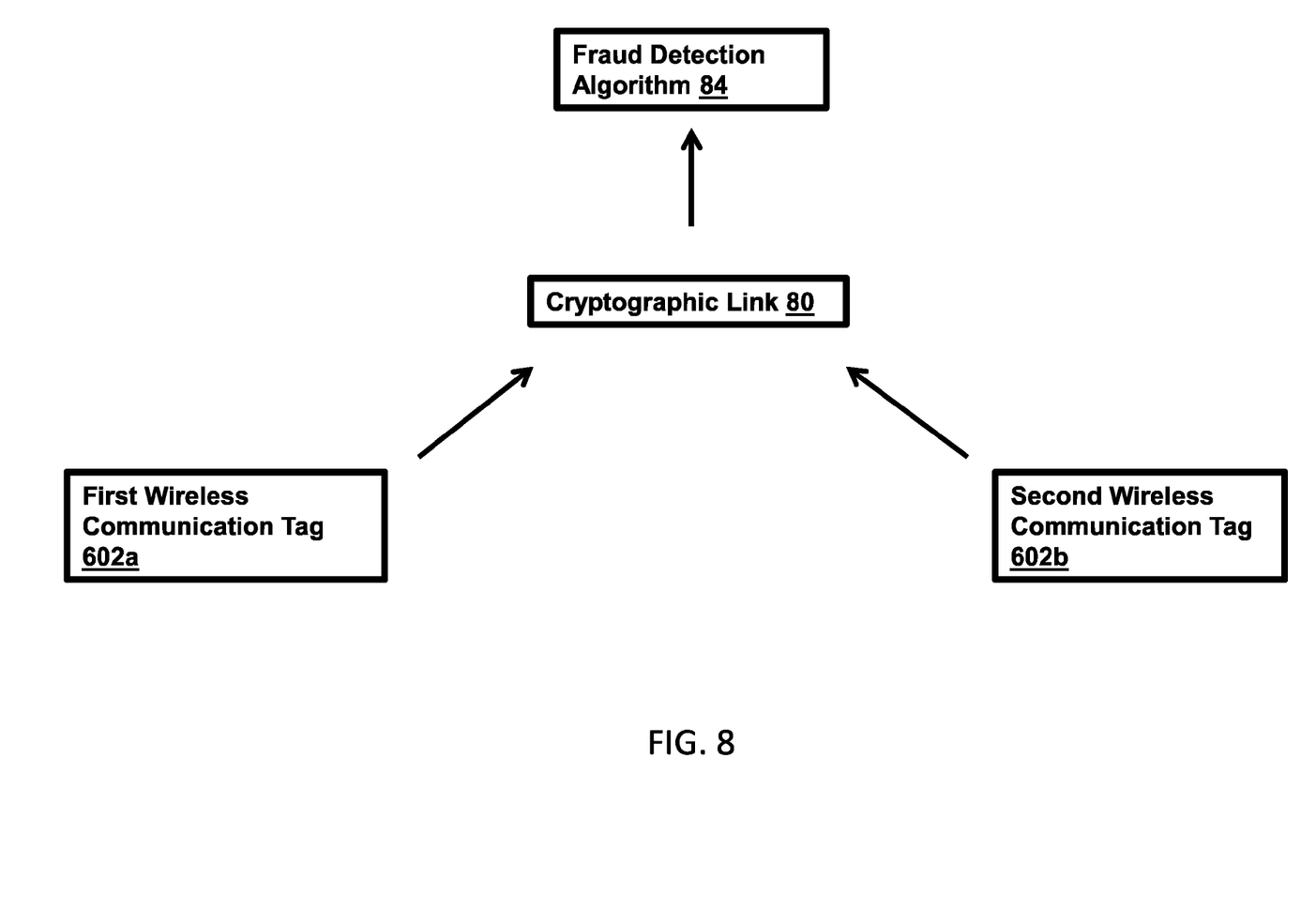
FIG. 8 is a flow diagram showing the cryptographic link between wireless communication tags.

As shown in FIG. 8, the use of the at least two wireless communication tags 602*a* and 602*b* allows the wireless communication tags 602*a* and 602*b* to be cryptographically linked by cryptographic link 80 according to the present disclosure. Typically, wireless communication tags are manufactured with unique identification numbers, or serial numbers. NFC tags are generally manufactured with a serial number that allows them to be identified by any user with a device such as a smart phone. However, wireless communication tags such as an NFC tag, under the present disclosure, may be cryptographically linked.

According to the present disclosure, the identification numbers of each wireless communication tag 602*a* and 602*b* are linked with a cryptographic code. The code that links the two wireless communication tags 602*a* and 602*b* is a hidden identifier, known only, initially, to the producer of the system of the present disclosure. A fraud detection algorithm 84 uses cryptographic link 80 which links the identifiers of each individual code in wireless communication tags 602*a* and 602*b* to determine a probability of fraud.

Therefore, even if at least one of wireless communication tags 602*a* and 602*b* is copied and used to replace at least one of wireless communication tags 602*a* and 602*b* for fraudulent purposes, the combination of wireless communication tags 602*a* and 602*b* will identify fraud due to a lack of cryptographic link 80, which would be unknown to a fraudster. An attempt at fraud would fail because the cryptographic code which links wireless communication tags 602*a* and 602*b* wouldn't be identified by fraud detection algorithm 84. Fraudulent replacement wireless communication tags would be identified as fraudulent because the cryptographic link 80 would not be present.

The use of wireless communication tags, such as NFC tags, in conjunction with the adhesive strip 604 allows for the adhesive strip 604 to be manufactured separately with the wireless communication tag(s) attached and then later applied to the container 600 at a later date. The container may be a large container such as a drum or box or a small container such as a pharmaceutical bottle.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A system for detecting fraud for a container, comprising:
   at least one wireless communication tag configured to contain information about the container;
   the container having a container closure and a container body;
   a reading device configured to scan the near field communication tag for accessing the information about the container;
   a database containing information related to a probability of fraud based on the information about the container;
   an algorithm, wherein the algorithm executes on a processor that is in communication with the near field communication tag via a wireless protocol and, after exchanging data with the near field communication tag, the processor executes the algorithm and determines the probability of fraud based on information contained in the database.

2. The system of claim 1, wherein the container is a twist-top container and the container closure is a twist-off top.

3. The system of claim 1, wherein the at least one wireless communication tag is at least partially encapsulated with a wax composition.

4. The system of claim 1, wherein there is a junction between the container body and the container closure and a first wireless communication tag is attached to the container closure and the container body and spans the junction.

5. The system of claim 1, wherein at least two wireless communication tags are affixed to an adhesive strip that is affixed to the container body and the container closure; wherein a first wireless communication tag is attached to the adhesive strip at a junction between the container body and the container closure such that the first wireless communication tag is destroyed upon removing the container closure while a second wireless communication tag is undamaged upon removing the container closure.

6. The system of claim 5, wherein the at least two wireless communication tags are encapsulated on the container with a thin polymer film that wraps around the first wireless communication tag and the container closure.

7. The system of claim 1, wherein a thin polymer film is contracted around the container and the at least one tag.

8. The system of claim 6, wherein the adhesive strip thin is a polymer film.

9. The system of claim 1, wherein the at least one tag is a near field communication tag.

10. The system of claim 5, wherein the at least two wireless communication tags are affixed to the adhesive strip that is attached to a twist-top container and twist-off container top; wherein the first wireless communication tag is attached at the junction between the twist-top container and the twist-off container top such that the first wireless communication tag is destroyed upon twisting of the twist-off container top to remove the twist-off container top from the twist-top container based on information contained in the database.

11. The system of claim 1, wherein at least two wireless communication tags are attached to the container; wherein the at least two wireless communication tags have a cryptographic link such that the at least two communication tags are identifiable by a linking code available only through a linkage code creator, wherein the algorithm can identify a breakage in the cryptographic link to detect fraud such that even if the at least one wireless communication tag is copied and used to replace a broken tag the cryptographic link will be broken and fraudulent activity will be identified due to the breakage of the cryptographic link.

12. The system of claim 1, wherein a first wireless communication tag is at least partially encapsulated with a wax composition.

13. One or more non-transitory computer storage media storing computer-usable instructions, that when used by one or more computing devices, cause the one or more computing devices to perform a method for detecting fraud for a container, the method comprising:
obtaining the container having a container body and a container closure;
storing information about the container on at least one wireless communication tag;
joining the at least one wireless communication tag with the container closure positioned on the container;
scanning a region proximal to the container closure for reading the wireless communication tag with a reading device;
accessing the information from a remote database; and
predicting a probability of fraud based on the information about the container; wherein the step of predicting the probability of fraud comprises analyzing the information about the container with an algorithm; wherein the algorithm executes on a processor that is in communication with the at least one wireless communication tag via a wireless protocol and, after exchanging data with the at least one wireless communication tag, the processor executes the algorithm and determines the probability of fraud based on information contained in the database.

14. The method of claim 13, wherein the at least one wireless communication tag is a near field communication tag.

15. The method of claim 13, further comprising encapsulating the at least one wireless communication tag and the container closure with a polymer film.

16. The method of claim 13, further comprising attaching the at least one wireless communication tag to an adhesive strip; attaching the adhesive strip to the container body and the container closure; wherein a first wireless communication tag is attached to the adhesive strip at a junction between the container body and the container closure such that the first wireless communication tag is destroyed upon removing the container closure.

17. The method of claim 13, further comprising at least partially encapsulating the at least one wireless communication tag with a wax composition.

18. One or more non-transitory computer storage media storing computer-usable instructions, that when used by one or more computing devices, cause the one or more computing devices to perform a method for detecting fraud for a container, the method comprising:
obtaining the container having a container body and a container closure;
storing information about the container on at least two wireless communication tags;
attaching the at least two wireless communication tags to an adhesive strip;
spacing the at least two wireless communication tags on the adhesive strip such that when the adhesive strip is applied to the container a first wireless communication tag spans a junction of the container and a second wireless communication tag is located away from the junction such that separation at the junction destroys the first wireless tag while the second wireless communication tag is undamaged;
applying the adhesive strip to the container;
scanning a region proximal to the container closure for reading the wireless communication tag with a reading device;
accessing the information from a remote database; and
predicting a probability of fraud based on the information about the container; wherein the step of predicting the probability of fraud comprises analyzing the information about the container with an algorithm; wherein the algorithm executes on a processor that is in communication with the at least two wireless communication tags via a wireless protocol and, after exchanging data with the at least two wireless communication tags, the processor executes the algorithm and determines the probability of fraud based on information contained in the database.

19. The method of claim 18, wherein the at least two wireless communication tags have identification codes, wherein the identification codes of the at least two wireless communication tags that have a cryptographic link such that the identification codes of the at least two communication tags are identifiable by a linking code available only through a linkage code creator, wherein the algorithm identifies damage to at least one of the at least two wireless communication tags as a breakage in the cryptographic link in order to detect fraud such that even if at least one of the at least two wireless communication tags is copied and used to replace a broken tag the cryptographic link will be broken and fraudulent activity will be identified due to the breakage in the cryptographic link.

20. The method of claim 18, wherein the at least two wireless communication tags are custom manufactured to be placed at predetermined locations on the adhesive strip based on a specific design of the container, such that when the adhesive strip is applied to a container the first wireless communication tag is located at the junction and the second is located in a position optimal for minimizing risk of damage to the second wireless communication tag and optimal for aesthetic appeal based on purchaser request.

* * * * *

UNITED STATES PATENT AND TRADEMARK OFFICE
CERTIFICATE OF CORRECTION

PATENT NO. : 9,916,745 B2
APPLICATION NO. : 15/358696
DATED : March 13, 2018
INVENTOR(S) : Steven M. Glamuzina, Jr. and Jeffrey C. Murphy It is certified that error appears in the above-identified patent and that said Letters Patent is hereby corrected as shown below:

In the Claims

Column 14, Line 7, cancel the text beginning with "1. A system for" to and ending with ""the database." in Column 14, Line 24, and insert the following claim:
--1. A system for detecting fraud for a container, comprising:
at least one wireless communication tag configured to contain information about the container; the container having a container closure and a container body;
a reading device configured to scan the wireless communication tag for accessing the information about the container;
a database containing information related to a probability of fraud based on the information about the container;
an algorithm, wherein the algorithm executes on a processor that is in communication with the wireless communication tag via a wireless protocol and, after exchanging data with the wireless communication tag, the processor executes the algorithm and determines the probability of fraud based on information contained in the database.--

Signed and Sealed this
Twenty-ninth Day of October, 2019

Andrei Iancu
*Director of the United States Patent and Trademark Office*